United States Patent Office 3,005,255
Patented Oct. 24, 1961

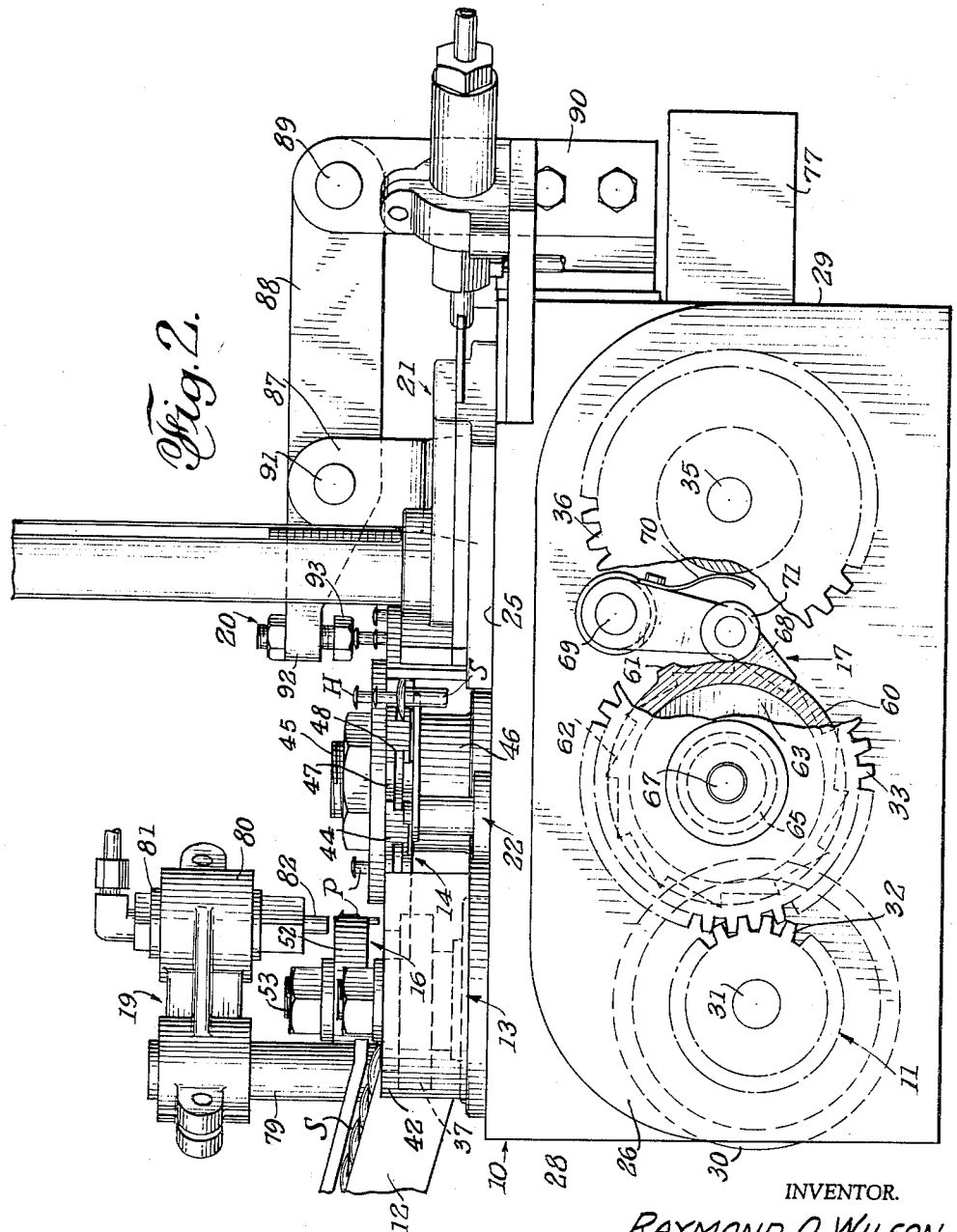

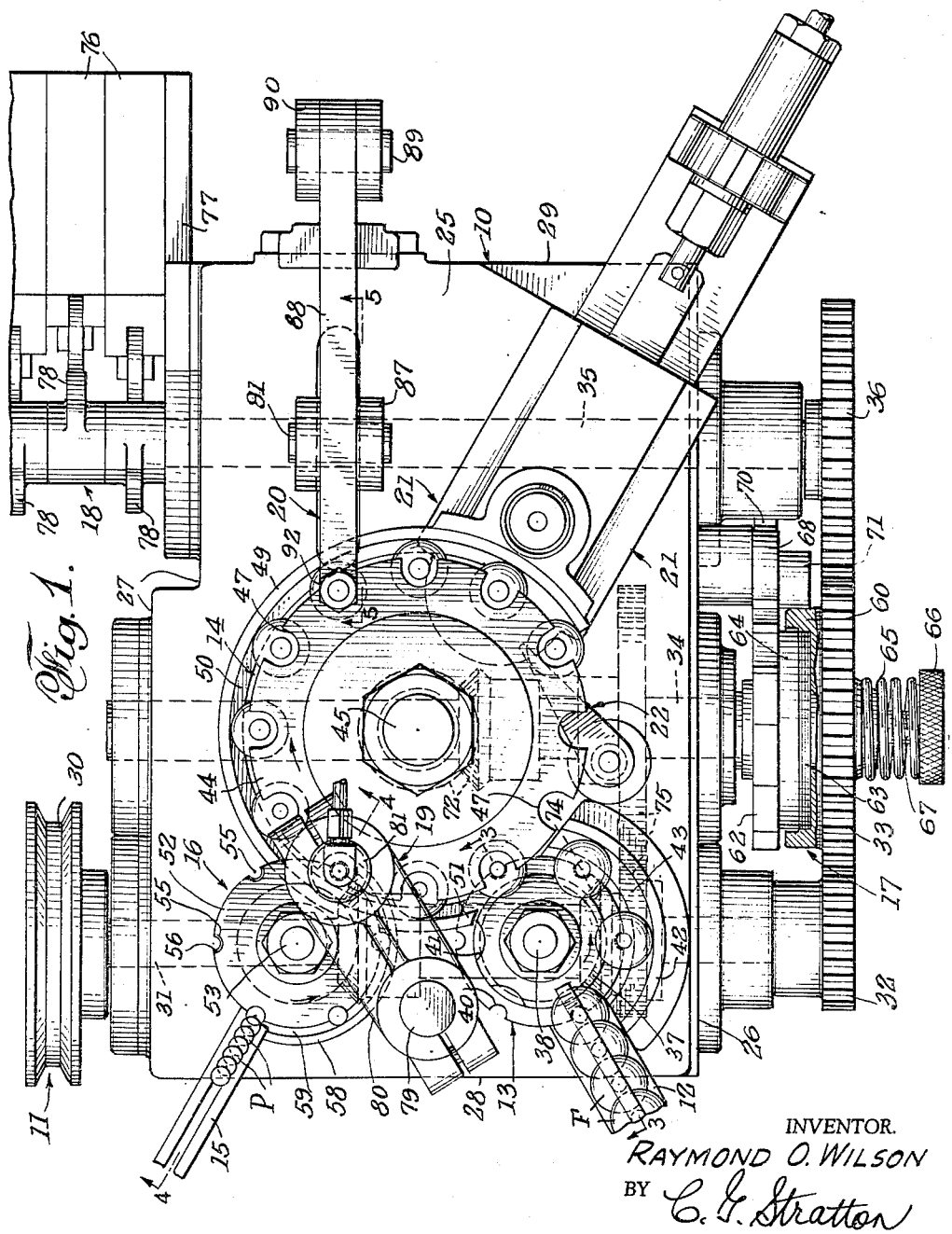

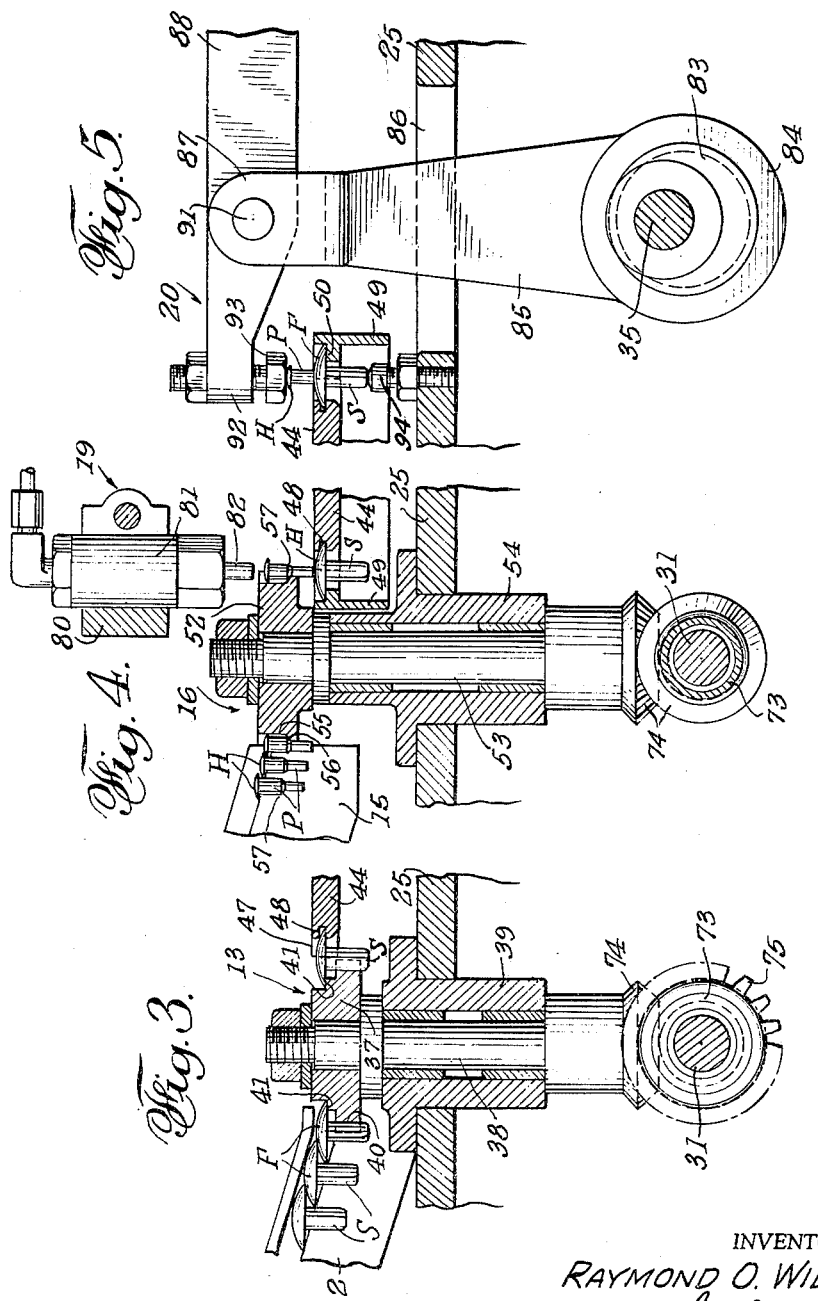

3,005,255
DRIVE RIVET ASSEMBLING MACHINE
Raymond O. Wilson, San Marino, Calif., assignor to Olympic Screw & Rivet Corporation, Los Angeles, Calif., a corporation of California
Filed Mar. 16, 1959, Ser. No. 799,598
7 Claims. (Cl. 29—208)

This invention relates to a machine for assembling the sleeve and pin of a drive rivet and has for an object to provide an automatic machine that brings together such sleeve and pin, inserts the pin into the sleeve and, thereafter, if desired, places a sealing washer on the sleeve beneath the head thereof. The present machine performs an operation that had heretofore been carried out by hand in a slow and expensive manner.

A drive rivet, such as assembled by the present machine, comprises a longitudinally slitted sleeve having one end with a transverse wall and the other with an enlarged head or flange. Said wall is divided by the slits but the flange is whole. A pin having a head at one end, a reduced shank at the other end, and an intermediate larger shank occupies the bore of the sleeve with the reduced shank directed toward the sleeve wall and the head outward of and spaced from the flange on the sleeve. By providing an annular shoulder in the sleeve bore, driving of the pin into the sleeve, after the sleeve has been placed in aligned holes of members to be fastened together, causes the intermediate shank to spread the slitted sleeve and clinch the same over the side of the members to be fastened that is opposite to the side engaged by the flange or head. Thus, the rivet is set by driving the pin axially relative to the sleeve. The mentioned washer under the head will, accordingly, be compressed around the holes through which the sleeve is entered and the same effectively seals therearound.

It will be realized that the pins, when initially assembled into the sleeve, must be sufficiently tight therein to obviate accidental displacement and subsequent separation of the sleeve and pin. To do this by hand is quite difficult, if not impossible, and so-called hand assembly entailed the use of mechanical aids, such as arbor presses, further slowing manual assembly time.

Another object of the invention is to provide a machine in which sleeves are fed and intermittently moved toward a discharge, and pins are first partly placed in the bores of the sleeves and then more fully pressed thereinto during periods of rest of the sleeves, thereby enabling performing of pin-assembling operation on several sleeves, simultaneously.

A further object of the invention is to suspend the sleeves by means of their flanges or heads while being moved intermittently and pressing movement-synchronized pins from above partly into the bores of said sleeves while so supported one at a time.

A still further object of the invention is to provide a machine as above contemplated in which further entry of the pins in the bores and, optionally, placing washers on the sleeves beneath the heads thereof are operations simultaneously performed with initial assembly of a sleeve and pin.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

FIG. 1 is a top plan view of a drive rivet assembling machine embodying a preferred form of the present invention.

FIG. 2 is a side elevational view thereof as seen from the lower side of FIG. 1.

FIGS. 3, 4 and 5 are fragmentary vertical sectional detail views, as taken on the respective lines 3—3, 4—4 and 5—5 of FIG. 1.

The machine that is illustrated comprises, generally, a base 10, a continuously-operating drive 11 mounted on said base, a chute 12 for supplying sleeves S, in one-by-one sequence, to the machine, sleeve-transporting means 13 that receives sleeves from the chute 12, index means 14 that receives sleeves transported thereto by the means 13, a chute 15 for supplying pin P, in one-by-one sequence, to the machine, pin-transporting means 16 that receives pins from the chute 15 and transports the same synchronously into register or vertical alignment above and with the sleeves in the index means 14, an intermittent drive 17 between the continuous drive 11 and the means 13, 14 and 16 to drive the latter means intermittently, compressed air-supplying means 18 continuously operated by the drive 11, means 19, controlled by the means 18, to partly insert a pin P into the bore of a sleeve S when such pin and sleeve are in aligned register, means 20 to further press such a pin into the sleeve in which inserted, means 21 to provide such a sleeve and pin assembly with a washer, and means 22 to strip or discharge a drive rivet assembly from the means 14.

The base 10 is shown as a generally rectangular housing having a top wall 25, side walls 26 and 27, and end walls 28 and 29. The interior of the housing is hollow, the same housing most of the elements of the drive 11.

The continuous drive 11 is shown as a drive pulley 30 outward of the base wall 27 and mounted on a shaft 31 that spans between walls 26 and 27 and extends beyond the wall 26. This shaft extension is provided with a gear 32, and a gear 33 on a shaft 34 is in mesh with and is driven with the gear 32 by the pulley 30 (or other driven or driving means). The shaft 34 extends between and has bearing in the base walls 26 and 27. Said gear 33 is loosely carried by the shaft 34 and does not itself drive said shaft, as will later become apparent. The drive 11 further includes a shaft 35 that also spans between the walls 26 and 27, the same being provided with a gear 36 in mesh with the gear 33. Thus, the latter gear comprises a means for transmitting the rotation of gear 32 to gear 36 and, therefore, shaft 35 which rotates continuously.

The chute 12 is quite conventional and may feed sleeves S from a tumbling hopper, for instance, so that sleeves are fed in line while suspended by their flanges F in such manner that the slitted sleeves are pendant, as may be seen in FIG. 3.

The sleeve-transporting means 13 is shown as comprising a disc 37 that is mounted on a vertical shaft 38 normal to the drive shaft 31 and in register therewith, as can be seen in FIGS. 1 and 3. Said shaft 38 is housed in a bearing 39 that is mounted on the top wall 25 of the base 10. The disc 37 is provided with a set of peripheral, uniformly spaced seats or notches 40, the same being of a size and shape to receive sleeves S with the flanges F thereof resting upon ledges 41 of said disc.

The means 13 also includes a guard 42 that engages the outer edges of the sleeve flanges F to retain the sleeves in their seats during transport from chute 12 to the means 14. Said guard includes an arcuate ledge 43 on which said sleeve flanges slide during such transport, thereby maintaining the sleeves in vertical disposition as the same near the means 14.

The index means 14 comprises a sleeve-holding disc 44 that is mounted on a vertical shaft 45 normal to the shaft 34 and in register therewith. Said shaft 45 is housed in a bearing 46 that is mounted on the top wall 25 of the base. Said disc 44 is provided with a set of uniformly spaced marginal recesses or seats 47 that are designed to receive the sleeves S from the disc 37 and hold the same with the flanges F in undercut deeper portions 48 of said recesses 47.

A guard 49 is provided around the periphery of the disc 44 to retain the sleeves against outward displacement. A ledge 50 on said guard cooperates with the recess portions 48 to support the sleeves vertically. Said guard and ledge extend circumferentially from just beyond where the sleeves are transferred from disc 37 to disc 44 to just before the station of discharge of assembled rivets is effected by the means 22. In fact, the end 51 of the guard 49 serves to strip the sleeves from disc 37 and set the same into the seats 47 of the disc 44. Since discs 37 and 44 are substantially coplanar, as can be seen in FIG. 3, the mentioned interruption of the guard 49, as well as of the guard 42, enables direct transfer of sleeves, as above indicated.

In this case, the disc 44 is shown with twice as many recesses 47 as there are recesses 40 in disc 37. Thus, it will require two revolutions of disc 37 for each revolution of disc 44. This proportion is true also between the disc 52 of the means 16 and index disc 44.

The chute 15 conventionally feeds pins P to the mentioned disc 52 by suspending said pins by their enlarged heads H much in the same manner that the sleeves S are suspended by their flanges F.

Said pin-transporting means 16 comprises the mentioned disc 52, the same being mounted on a vertical shaft 53 normal to the drive shaft 31 and in register therewith, as shown in FIGS. 1 and 4. Said shaft 53 is housed in a bearing 54 mounted on the top wall 25 of the base. Said disc 52 is provided with peripheral seats 55 of a size and shape to receive pins P with the heads H thereof up. Said seats are provided with shoulders 56 to accommodate shoulders 57 of the pins, as may best be seen in FIG. 4.

The means 16 includes a guard 58 for holding the pins in their seats and with a ledge 59 on which the heads H of said pins ride during transport from the chute 15 to a seat 47 in the index disc 44.

As can be seen in FIG. 4, the disc 52 is elevated with respect to disc 44 and, when transfer of pins from one disc to the other is effected, a seat 55 of disc 52 is directly aligned with a seat 47 of disc 44.

The circles on which the seats of discs 37 and 52 are disposed and the circle of seats 47 of discs 44 are, of course, tangent so that proper transfer of sleeves to disc 44 may be effected as well as vertically aligning a pin and sleeve along the line that extends through the axes of discs 44 and 52. However, because the discs all index simultaneously, the disc 37 has a portion (see FIG. 3) that is lower than the lower face of disc 44. As a consequence, while discs 44 and 37 are generally coplanar, the sleeve-engaging seats are formed in a periphery that overlaps the circle of disposition of the seats 47 of disc 44.

The intermittent drive 17 provides for a drive relationship of one revolution for disc 44 for each two revolutions of discs 37 and 52, as above explained. Said drive 17 has the gear 33 as its prime mover.

The gear 33 is provided with a recessed hub 60 on which is provided a radially projecting lug 61. A ratchet heel 62 is affixed, as by an ordinary key, to the shaft 34, and friction packing 63 is disposed in the recess of hub 60 and in flatwise engagement with a hub 64 of the ratchet wheel. Friction between the ratchet wheel and the gear 33 is created by means of a compression spring 65 that biases the latter gear toward the ratchet wheel by resilient pressure imposed by a nut or knob 66 threaded on an extension 67 of the shaft 34. It will be clear that, when the ratchet wheel is free to turn, the friction between gear 33 and said wheel will cause shaft 34 to turn.

However, ordinarily, the ratchet wheel is held against rotation by a pawl 68 on a pivot 69 in the base wall 26, a spring 70 biasing said pawl in a direction to engage the ratchet wheel teeth. A roller 71 on the pawl rides the gear hub 60 when the ratchet and pawl are engaged. When the lug 61 on said hub engages said roller, the pawl is moved on its pivot to free the ratchet wheel. It is during this period of release of the wheel 62 that the drive 11 is effective, through the intermittent drive, to cause an intermittent advance of the shaft 34. Immediately that the lug 61 rides by the roller 71, the pawl spring 70 returns the pawl to ratchet-stopping engagement with the next or oncoming tooth of the ratchet wheel. Therefore, for each full revolution of the gear 33, the shaft 34 is advanced one-twelfth of a revolution, according to the number of teeth in wheel 62.

By means of bevel gearing 72 connecting shafts 34 and 45, the intermittent advance of the shaft 34 is imparted to the index disc 44. Since said gearing is meter gearing and there are twelve recesses 47 in disc 44, said recesses and the sleeves S carried thereby are intermittently advanced in twelfths of a revolution.

Since the discs 37 and 52 each have but six seats for the sleeves and pins they respectively carry, said discs are advanced in sixths of a revolution. To this end, a sleeve 73 is provided on the shaft 31, said sleeve merely using said shaft, as a support on which it may freely turn. Bevel gearing 74 connects shaft 38 and sleeve 73 and similar bevel gearing connects shaft 53 and said sleeve. By providing two-to-one gearing 75 between shaft 34 and sleeve 73, the intermittent advance of said latter shaft is imparted as a one-sixth advance of the sleeve 73 and of the discs 37 and 52.

The air-supplying means 18 is shown as being driven by the shaft 35 and comprises a set of valves 76 carried by a bracket 77 affixed to the wall 27 of the base, and a set of cams 78 on an extension of shaft 35 beyond said wall and operatively engaged with said valves to actuate the same synchronously, as desired. The details of construction of the means 18 is not pertinent to the present invention, it being understood that such components of the machine that are operated by compressed air may be supplied with such air under control by the cams 78.

The means 19 is shown as comprising a support post 79 extending upwardly from the top wall 25 of the base 10, a fixed arm 80 carried by said post, an air cylinder 81 on the end of arm 80 and provided with a plunger or stem 82 that is above and in aligned register with the beforementioned aligned recesses 47 and 55 of the respective discs 44 and 52. It will be clear that the means 18, in proper timing, may supply air to cylinder 81 to cause projection of the stem 82. The latter, in its downward movement from the position of FIG. 4, pushes a pin P from said seat 55 and into the bore of a sleeve S therebeneath. In this manner, the reduced end of the pin is partly entered into the pin during a period of rest of the discs 44 and 52. Thereafter, the stem 82 may be retracted either by air controlled by the means 18 or by a spring in said cylinder 81.

The use of air in this initial and partial insertion of a pin in a sleeve insures against undue breakage of parts should there be a mis-alignment between sleeve and pin or for any reason that may prevent proper insertion of the pin into the sleeve bore. More powerful, positive mechanical means is reserved for use in pushing the pin into the sleeve to the ultimate position thereof, as at the right of disc 44 in FIG. 2.

Such positive-acting mechanism is shown as the means

20. An eccentric 33 on shaft 35 is connected in the strap 84 of a connecting rod 85, the upper end of which extends through an opening 86 in the base wall 25 and terminates in a bifurcation 87. A pin-setting lever 88 is carried by one end by a pivot 89 on a bracket 90 affixed to the wall 29 of the base 10. A pin 91 connects said lever and the yoke end of the connecting rod. It will be clear that rotation of shaft 35 causes rocking of the lever 87 on its pivot 88, moving end 92 of said lever toward and from the head H of a pin P in a sleeve S at a station of wheel or disc 44 that is directly beneath said lever end 92.

Since the pin is already disposed in the sleeve bore, any slight misalignment of the setting screw 93 on lever end 92 will be immaterial to the proper setting operation. Accordingly, the positive mechanical nature of the means 20 may be safely used to press or set the pin into the sleeve. This pin-setting operation occurs simultaneously with the placing of a pin in a sleeve by the means 19.

It will be noted that the pressure exerted to set the pin is counteracted by a stud 94 that engages and supports the lower end of the sleeve S, thereby saving the disc 44 and the guard 47 from excessive downward forces of the means 20.

The means 21 places a rubber washer on the sleeve S beneath the head thereof. This mechanism, per se, does not form part of this invention since the same is fully disclosed in a companion application entitled "Clinch Pin Assembling Machine and Method," filed February 24, 1959, Serial No. 795,026, now abandoned. The means 21 acts at a station of the disc 44 that is between where the means 20 operates and where the stripper means 22 is provided. The latter means is also fully disclosed in said earlier-filed application and is here shown to provide a complete machine for the purpose intended.

The means 21 is air-operated under control of the means 18.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what I claim and desire to secure by Letters Patent is:

1. A machine for assembling the sleeves and pins of drive rivets that comprises an index disc having uniformly spaced marginal seats therein, a coplanar disc tangent to the index disc and having sleeve-transporting seats in the margin thereof to transport sleeves to the seats of the index disc, a third disc upwardly offset from the index disc and having marginal pin-transporting seats therein, the seats in the index disc and in the third disc being in vertical alignment when said seats reside in a line that extends through the axes of said latter disc, a pin in the pin-transporting disc, thereby, being vertically aligned above a sleeve in the index disc, air-operated means to push said pin from its seat in the third disc partly into the sleeve therebeneath, means to index the index disc and the two other discs to effect transfer of another sleeve to the index disc and align vertically another pin and a sleeve carried by the index disc, said index movement of the index disc moving a pin-provided sleeve out of vertical alignment with the air-operated means, and means to further set the pin into the sleeve of the pin-provided sleeve after such intermittent rotation of the discs.

2. A machine according to claim 1 in which the pin-setting means comprises a positive, cam-operated mechanism that presses downwardly on the pin, and a support for the sleeve during the pin-setting operation.

3. A machine for assembling the sleeve and pin of a drive rivet that comprises a first disc provided with peripheral sleeve-receiving and -carrying stations, means to intermittently rotationally drive said disc, a second disc coplanar with the first disc and provided with peripheral sleeve-holding stations to transport sleeves, one at a time, to the stations of the first disc, a third disc offset upwardly from the first disc and provided with peripheral pin-holding stations to transport pins, one at a time, to a position above a sleeve in a carrying station of the first disc, means to drive the second and third disc intermittently from the drive of the first disc, means disposed above and in register with a pin above a sleeve to downwardly displace said pin partly into said sleeve, and means above a pin that is partly entered into a sleeve to set said pin farther into the sleeve.

4. A machine according to claim 3 in which air control is provided for operating the means that partly enters a sleeve.

5. A machine according to claim 3 in which air control is provided for operating the means that partly enters a sleeve, and cam operated mechanical control is provided for the means that sets the pin farther into the sleeve.

6. In a machine for assembling the sleeves and pins of drive rivets, an intermittently rotating disc having circularly arranged peripheral sleeve-holding seats, a disc to transfer sleeves, one at a time, to said seats and comprising a disc having a portion coplanar with the rotating disc and a lower portion below the lower face of the latter disc, the transfer disc having peripheral seats arranged on a circle tangent to the circle of the seats in the rotating disc, said lower portion of the coplanar disc having a peripheral edge overlapping said circle in the rotating disc, a third disc to transfer pins, one at a time, toward and above the sleeves in the rotating disc and disposed in a plane wholly above the plane of the rotating disc, said third disc having peripheral pin-holding seats on a circle tangent to the circle of the seats in the rotating discs, means vertically aligned with a pin that is aligned with a sleeve to push said pin from a seat in the third disc into the latter sleeve in the rotating disc during a period of rest of the three discs, and air-operated means controlling the last-mentioned means and comprising a pusher stem subject to the elasticity of the air pushing the same.

7. In a machine for assembling the sleeves and pins of drive rivets, an intermittently rotating disc having circularly arranged peripheral sleeve-holding seats, a disc to transfer sleeves, one at a time, to said seats and comprising a disc having a portion coplanar with the rotating disc and a lower portion below the lower face of the latter disc, the transfer disc having peripheral seats arranged on a circle tangent to the circle of the seats in the rotating disc, said lower portion of the coplanar disc having a peripheral edge overlapping said circle in the rotating disc, a third disc to transfer pins, one at a time, toward and above the sleeves in the rotating disc and disposed in a plane wholly above the plane of the rotating disc, said third disc having peripheral pin-holding seats on a circle tangent to the circle of the seats in the rotating discs, means vertically aligned with a pin that is aligned with a sleeve to push said pin from a seat in the third disc into the latter sleeve in the rotating disc during a period of rest of the three discs, air-operated means controlling the last-mentioned means and comprising a pusher stem subject to the elasticity of the air pushing the same, and means to mechanically and positively further set the pin into the sleeve after intermittent movement of the discs.

References Cited in the file of this patent

UNITED STATES PATENTS

| | | |
|---|---|---|
| 1,830,446 | Schunemann | Nov. 3, 1931 |
| 2,237,359 | Ott | Apr. 8, 1941 |
| 2,692,424 | Habel | Oct. 26, 1954 |
| 2,698,478 | Heisterkemp | Jan. 4, 1955 |
| 2,729,882 | Goodwin | Jan. 10, 1956 |